United States Patent
Wittner et al.

(10) Patent No.: US 11,673,977 B2
(45) Date of Patent: *Jun. 13, 2023

(54) METHODS FOR MODIFYING THE RHEOLOGY OF POLYMERS

(71) Applicant: Lummus Novolen Technology GmbH, Mannheim (DE)

(72) Inventors: Manfred Wittner, Mannheim (DE); Angela Hilgers, Bruchsal (DE); Geoffrey Detavernier, Idstein (DE); Michael Neidhoefer, Mainz (DE)

(73) Assignee: Lummus Novolen Technology GmbH, Mannheim (DE)

( * ) Notice: Subject to any disclaimer, the term of this patent is extended or adjusted under 35 U.S.C. 154(b) by 70 days.

This patent is subject to a terminal disclaimer.

(21) Appl. No.: 16/921,433

(22) Filed: Jul. 6, 2020

(65) Prior Publication Data

US 2020/0332032 A1 Oct. 22, 2020

Related U.S. Application Data

(63) Continuation of application No. 15/549,709, filed as application No. PCT/EP2016/052838 on Feb. 10, 2016, now Pat. No. 10,703,831.

(30) Foreign Application Priority Data

Feb. 10, 2015 (EP) .................................... 15154574

(51) Int. Cl.
| | | |
|---|---|---|
| *C08F 6/02* | (2006.01) | |
| *C08J 3/20* | (2006.01) | |
| *C08J 3/00* | (2006.01) | |
| *C08L 23/16* | (2006.01) | |
| *C08F 8/50* | (2006.01) | |
| *C08F 6/28* | (2006.01) | |
| *C08F 110/06* | (2006.01) | |

(52) U.S. Cl.
CPC .................. *C08F 6/02* (2013.01); *C08F 6/28* (2013.01); *C08F 8/50* (2013.01); *C08F 110/06* (2013.01); *C08J 3/00* (2013.01); *C08J 3/201* (2013.01); *C08L 23/16* (2013.01); *C08J 2323/00* (2013.01)

(58) Field of Classification Search
CPC ...... C08F 6/02; C08F 6/28; C08F 8/50; C08F 110/06; C08J 3/00; C08J 3/201; C08J 2323/00; C08L 23/16
See application file for complete search history.

(56) References Cited

U.S. PATENT DOCUMENTS

| | | | |
|---|---|---|---|
| 3,232,918 A | 2/1966 | Stephen | |
| 6,103,833 A * | 8/2000 | Hogt | C08F 8/50 |
| | | | 525/333.8 |
| 2012/0219813 A1 | 8/2012 | Vignola et al. | |
| 2013/0137834 A1 * | 5/2013 | Dagley | C08K 5/09 |
| | | | 525/333.7 |

FOREIGN PATENT DOCUMENTS

WO  WO-0042078 A1 * 7/2000  .............. C08F 2/40

OTHER PUBLICATIONS

Mason Publications, Research Disclosure, Controlled degradation of polypropylene using aqueous emulsions of organic peroxides, Aug. 1, 1998, p. 1073. (Year: 1998).*

Extended European Search Report issued in corresponding EP Application No. 20204958.1 dated Feb. 15, 2021 (9 pages).

* cited by examiner

*Primary Examiner* — John E Uselding

(74) *Attorney, Agent, or Firm* — Osha Bergman Watanabe & Burton LLP

(57) ABSTRACT

The disclosure relates to a method for modifying the rheology of a polymer and a polymeric composition obtained by the method. The composition comprises at least one organic peroxide and water in emulsion form. The polymer may comprise a polyolefin. The method comprises extruding a molten polymer and the composition and removing volatile compounds from the molten polymer.

11 Claims, No Drawings

METHODS FOR MODIFYING THE RHEOLOGY OF POLYMERS

BACKGROUND OF INVENTION

Technical Field

The present disclosure relates to a method for modifying the rheology of polymers as well as to polymeric compositions obtained by such a method.

Background Art

Polymers, such as for example polyolefins produced with Ziegler-Natta catalysts, may have high molecular weights and broad molecular weight distributions, thus having a high melt viscosity, which is evidenced by a low Melt Flow Rate (MFR). These properties are undesired when processing polyolefins in some product applications, such as for example molding, films and fibers applications. Therefore, methods have been developed for reducing the polyolefin molecular weight and for narrowing the molecular weight distribution by changing the rheology of the polyolefin, for example by reducing the viscosity of the polyolefin in liquid phase. A narrow molecular weight distribution and an increase in melt flow rate are responsible for improved flow properties of polyolefins. This change in the rheology for improving the flow properties of polyolefins, thus making the polyolefins more suitable for some product applications, is described as "modifying" the rheology of the polyolefins. The viscosity reduction is also described as polymer "visbreaking" or "degradation". Viscosity reduction is conventionally applied, for example to polypropylene.

In the present application, rheological modification is intended to indicate any rheological modification, including "visbreaking" and cross-linking of polymers, which may also be accompanied by degradation side-reactions. Cross-linking is conventionally applied, for example, to polyethylene.

It is known to use organic peroxides for the rheological modification of polyolefins.

A known process for visbreaking polyolefins is extrusion performed at a temperature of about 190° C.-260° C. in the presence of an organic peroxide compound. An example of this process is described in document AU 5141785 A, which relates to a process for the controlled reduction of average molecular weight and alteration of molecular weight distribution of C3-C8 alpha-monoolefin homopolymers or copolymers by adding a peroxide, such as such as 2,5-dimethyl-2,5-di(t-butylperoxy)hexane, continuously at a programmed cyclic rate to the polymer or copolymer and heating the mixture in a melt extruder.

However, due to their organic nature, pure organic peroxides are very unstable, volatile and dangerous species with high risk of ignition or explosion in case of uncontrolled increase of temperature and therefore require particular handling precautions. This behavior may be incompatible with the rules for transportation and storage and/or require special efforts for safe handling and storage, thus making the use of pure organic peroxides very expensive and technically complex. Also, the use of pure organic peroxides in an extrusion process, which is performed at high temperatures, is still more dangerous.

Accordingly, safe handling is a significant concern with organic peroxides and the use of pure organic peroxides in an extrusion process is problematic.

In the attempt of solving the issues relating to storage and transportation, organic peroxides have been diluted with mineral oil. By diluting the organic peroxide, less restricted peroxide product safety classes may be obtained. Also, dispersion of an organic peroxide in a polymer, for example a polyolefin, may be assisted by the dilution of the organic peroxide in mineral oil. However, although the organic peroxide may lower the viscosity of polyolefins and produce a relatively narrow molecular weight distribution, the organic peroxide leaves odor in the polyolefin from decomposition products. Furthermore, polyolefin yellowing may also be induced by the organic peroxide, requiring a lower extrusion temperature and/or stabilizers to eliminate or minimize the coloration. Also, the mineral oil causes several additional unwanted side effects impacting the polymer properties. For example, currently available mineral oil diluted organic peroxides provide no safety issue, allowing greater storage capacities with respect to those obtainable with pure organic peroxides, but introduce solvent into the polymer, which may disturb the polymer conversion into the final polymer products and may lead to additional degradation of by-products during the peroxidic reaction in the extruder. These degradation and by-products induce high volatiles organic compounds (VOCs) and undesired odors to the polymer and the final polymer product.

Another form in which peroxides may be used is that of aqueous peroxide emulsions. For example, document WO 00/42078 A1 describes aqueous peroxide emulsions used in polymerization reactions with the aim of broadening the class of anti-freeze additives which may be added to the polymer and of ensuring safety. The aqueous peroxide emulsions of document WO 00/42078 A1 contain an emulsifier system comprising a copolymer of an α,β-unsaturated dicarboxylic acid and a C8-24 α-olefin, the acid groups of which are esterified with an ethoxylated alcohol having a degree of ethoxylation of 1-45, as well as an ethoxylated fatty alcohol with an HLB value greater than 16. Document WO 00/42078 A1 states that these peroxide emulsions can be used in various polymerization reactions, including the curing of unsaturated polyester resins, and polymer modification reactions, including degradation, cross-linking, and grafting reactions. The peroxide emulsions of document WO 00/42078 A1 are stated to be pre-eminently suited for use in a polymerization process as (one of) the polymerization initiator (s) in the polymerization of vinyl chloride alone or in admixture with up to 40% by weight of one or more ethylenically unsaturated monomers copolymerizable therewith, oligomers and (co) polymers of the aforementioned monomers, and mixtures of two or more of these monomers, oligomers, and polymers. However, no example of polymer modification reaction is described in this document.

The known methods for modifying the rheology of polymers using organic peroxides, independently of the form in which organic peroxides are used (non-diluted organic peroxides, organic peroxides diluted in mineral oil and aqueous peroxide emulsions), do not allow to obtain polymers having a sufficiently low level of volatile organic compounds and a satisfactory low odor and/or color formation.

For example, in all known methods for modifying the rheology of polymers, an excessive content of volatile organic compounds is still found in the extruded polymer.

Further, in all known methods for modifying the rheology of polymers, degradation and color formation may be also caused by the conventional process required for deactivating active catalyst sites after the polymerization. For this purpose, in conventional methods, a separate deactivation vessel is arranged downstream of the polymerization reactor.

The deactivation is performed in the deactivation vessel with steam injected through the polymer powder bed. However, when the deactivation is either insufficient or non-uniform, the polymer has high potential for corrosion of the equipment, thus increasing the degradation potential of the polymer, with impacts on stabilizer consumption and color formation.

In view of the above, there is still the need of developing methods for modifying the rheology of a polymer, such as for example polypropylene and polyethylene, in a safe manner and resulting in a polymer having improved quality, in particular in terms of contents of volatile organic compounds, and odor and color formation. Additionally, there is still the need of providing methods for modifying the rheology of a polymer not requiring a further, separate deactivation step following the polymerization step.

SUMMARY OF INVENTION

The Applicant has surprisingly found that by using a composition comprising an organic peroxide emulsified with water, by contacting a polymer with the composition under extrusion conditions and by removing volatile compounds generated during extrusion from the molten polymer, not only safe transport and storage of the organic peroxide is ensured, but, in addition, the rheology of the polymer may be modified while reducing the generation of degradation and by-products in the polymer, which results in less VOCs, lower odor concentrations in the polymer and reduced color formation.

Recently, the inventors tested aqueous organic peroxide emulsions in an extrusion process comprising a step of removing volatile compounds from the molten polymer and were surprised to find that aqueous organic peroxide emulsions worked significantly and unexpectedly better than would have been predicted by using a corresponding amount of water and organic peroxide without emulsifying the organic peroxide with water. Also, the inventors were surprised to find that removing volatile compounds from the molten polymer unexpectedly resulted in a significant reduction of the generation of degradation and by-products in the polymer and in an improved degassing of the generated degradation and by-products.

According to a first aspect thereof, the present disclosure relates to a method for modifying the rheology of a polymer, comprising extruding a molten polymer and a composition comprising at least one organic peroxide and water in emulsion form, and removing volatile organic compounds and moisture from the molten polymer.

According to one or more embodiments, the method comprises removing organic volatile compounds resulting from the degradation of the organic peroxide and/or of the polymer.

According to one or more embodiments, the residual volatile organic compounds are less than 1100 mVs, for example less than 1000 mVs. According to one or more embodiments, the residual volatile organic compounds are less than 700 mVs, for example from 400 mVs to 650 mVs.

According to one or more embodiments, the method also comprises removing moisture from the molten polymer.

Extruding a molten polymer and a composition comprising at least one organic peroxide and water in emulsion form (i.e., an emulsion of at least one organic peroxide and water) is intended to indicate extruding a molten polymer in the presence of the emulsion. According to one or more embodiments, extruding a molten polymer and the emulsion may be performed by extruding the polymer, which may be for example in an initial powder or pellet form, adding the above-mentioned emulsion to the polymer, and melt extruding the polymer in the presence of said emulsion. Adding the emulsion to the polymer may be for example performed before or during the extrusion of the polymer.

Such a method as defined in the first aspect of the disclosure is effective for the rheological modification of polymers, for example for polymer degradation and/or cross-linking, without resulting in intolerable levels of odor and/or color and without requiring special handling precautions because storage, transportation and use are safe. For example, a storage capacity of above 1000 L may be obtained, which is convenient for storing materials intended to be used in high throughput extrusion plants.

Extruding may be performed in an extruder or in any other melt processing device. In both cases, extruding is performed under extrusion conditions. The water of the emulsion, under extrusion conditions, is in vapor form and, when removed, for example by venting the extruder, may extract undesired deactivated species and degradation products from the molten polymer in an enhanced manner. The enhanced degassing of undesired degradation products and by-products obtained by removing the vapor under extrusion conditions further reduces both VOCs and odor concentrations. As a consequence, an improved polymer degassing may be obtained during the rheological modification of the polymer. Thus, the method according to one or more embodiments of the present disclosure results not only in a modification of the rheology of the polymer by contacting the emulsion with the molten polymer under extrusion conditions, but also in an effective extraction of deactivated species and degradation products from the molten polymer.

Further, the use of water removes the need for mineral oil and the unwanted side effects thereof.

Also, water may deactivate the active catalyst sites remaining in the polymer. Therefore, by using water in the extruder, polymer deactivation can be accomplished in a single apparatus, i.e., in the extruder, without requiring a specific deactivation apparatus. By providing a sufficient mixing in the extruder along with the emulsion, the deactivation may be uniform and may be obtained in an efficient manner.

Thanks to the simultaneous improved degassing of undesired by-products catalyst and deactivation of active catalyst sites, it is possible to prepare purer polymers containing less reaction by-products and having improved organoleptic properties and less color formation.

Also, it was surprisingly found that an emulsion of at least one organic peroxide and water is more effective than the individual components thereof and that removing organic volatile compounds and water vapor from the molten polymer drastically reduces any generated degradation and by-product in the polymer.

According to one or more embodiments, the emulsion may be added to the polymer in such a manner that the amount of the at least one organic peroxide with respect to the amount of the polymer attains at a predetermined value. For example, the emulsion may be added to the polymer so that the amount of the at least one peroxide added to the polymer ranges from 100 ppm to 6000 ppm with respect to the amount of the polymer, where ppm, in the present disclosure and in the following claims, indicates mg of at least one organic peroxide feed/kg of polymer feed. For example, when extruding is performed in an extruder, the method, according to one or more embodiments, may further comprise feeding the polymer and the composition to the extruder so that a predetermined ratio between the at least one organic peroxide-feed and the polymer-feed (for example from 100 ppm to 6000 ppm, for example from 1500 ppm to 5000 ppm, for example of from 2000 to 3000 ppm) is attained.

According to one or more embodiments, the emulsion may be added to the polymer before the extrusion. According to one or more embodiments, the emulsion may be added to the polymer during the extrusion.

The emulsion of at least one organic peroxide and water may be for example obtained by using one or more emulsifiers.

According to one or more embodiments, the method comprises extruding a molten polymer in the presence of an emulsion comprising, for example consisting of, at least one organic peroxide, water and at least one emulsifier.

According to one or more embodiments, the emulsion may be prepared by adding water to the organic peroxide and at least one emulsifier (or a combination of a plurality of emulsifiers) in a plurality of stages to ensure that a homogeneous fluid is obtained after each addition. Also, after each addition step, the composition may be stirred.

Examples of emulsifiers which may be used to obtain a stable organic peroxide/water emulsion suitable for use in the method of the present application may be selected from the group of polyethoxy phenols, alkylene oxide block-copolymers, ethoxylated fatty alcohols, ethoxylated fatty acids, sorbitan fatty acid esters, sorbitol esters and combination thereof.

According to one or more embodiments, the emulsifiers may be selected from the group consisting of ethoxylated fatty alcohols and ethoxylated fatty acids.

According to one or more embodiments, the emulsifier or the plurality of emulsifiers may have a total HLB value of at least 6, for example of at least 8. For example, the emulsifier or the plurality of emulsifiers may have a total HLB value of at least 9. For example, the emulsifier or the plurality of emulsifiers may have a total HLB value of from 6 to 20, for example from 8 to 18.

According to one or more embodiments, the emulsion may have a predetermined total HLB (Hydrophilic-Lipophilic Balance), for example in the range from 8 to 18, for example from 9 to 16.

According to one or more embodiments, the emulsion may have a predetermined average droplet size, such as for example an average droplet size ($d_{50}$) between 1 microns to 100 microns, for example between 5 microns to 100 microns, for example between 10 microns and 80 microns, for example from 20 microns to 60 microns.

According to one or more embodiments, the emulsion may have a predetermined average droplet size and a predetermined HLB in combination.

Average droplet size may be determined by means known to one of ordinary skill in the art, for example by means of light diffraction techniques. The above-mentioned exemplary values of average droplet size refer to $d_{50}$, which corresponds to the average diameter such that 50% of the volume of the organic peroxide droplets in the emulsion has a diameter of less than $d_{50}$, measured by a Malvern Mastersizer 2000® at room temperature.

The HLB (Hydrophilic-Lipophilic Balance) refers to a HLB determined according to the method described by Griffin in 1949 (Journal of the Society of Cosmetic Chemists 1949, 1 (5): 311-26) and 1954 (Journal of the Society of Cosmetic Chemists 5 (4): 249-56). The HLB of an emulsifier is a measure of the degree to which it is hydrophilic or lipophilic, determined by calculating values for the different regions of the molecule. The total HLB of an emulsion comprising a number of components may be calculated on the basis of the HLB of each of the emulsion components and of the concentrations thereof in the emulsion.

According to one or more embodiments, extruding may be performed in the presence of one or more polymer additives. Exemplary additives may comprise, for example, fillers, antioxidants, fungicides, bactericides, reinforcing agents, antistatic agents, heat stabilizers, UV-stabilizers, flow enhancers, colorants and other additives or processing aids known to those skilled in the art.

According to one or more embodiments, extruding may be performed in an extruder at predetermined extrusion conditions suitable for extruding a polymer, such as for example at a predetermined extrusion temperature and at a predetermined extrusion pressure. With reference to an extruder, unless otherwise indicated, in the present description and in the following claims the exemplary extrusion temperatures and pressures are intended to indicate the barrel temperatures and pressures.

For example, extruding may be performed at an extrusion temperature of from 180° C. to 260° C., for example from 190° C. to 250° C., for example from 190° C. to 240° C.

According to one or more embodiments, the extrusion conditions may vary along the length of the extruder. For example, the extrusion temperature may increase or decrease along at least a portion of an extrusion path, which may extend along different extruder zones.

According to one or more embodiments, in each extruder zone, the temperature may be set within a predetermined temperature range.

According to one or more embodiments, the extruder may comprise, in the order, a feed zone, a solid conveying zone, a solid compression zone, a melting zone, a melt conveying zone, at least one decompression zone, a melt compression zone and a die zone. The feed zone feeds the polymer powder into the extruder and may be kept at a predetermined temperature to avoid that the polymer powder becomes sticky or melts and to ensure that the peroxide does not start reacting. The solid conveying zone transports the polymer powder towards the compression zone. The solid compression zone pressurizes the polymer powder, while most of the polymer is melted in the melting zone, and the melt conveying zone melts the last polymer particles and mixes to a uniform temperature and composition. The at least one decompression zone allows the molten polymer to be decompressed. The melt compression zone pressurizes the polymer melt, and the die zone forms the molten polymer into the desired shape for collection.

According to one or more embodiments, the extruder may also comprise a further melting and/or a further compression zone arranged downstream of the at least one decompression zone and a further melt conveying zone arranged downstream of the further melting zone. The further compression zone may serve to repressurize the melt to get the melt through the resistance of the screens and the die, and the further melt conveying zone may serve to further mix to a uniform temperature and composition.

According to one or more embodiments, the extruder may comprise two decompression zones. The two decompression zones may be separated by a mixing zone or may be immediately adjacent decompression zones.

According to one or more embodiments, extruding is performed at a temperature of from 30° C. to 200° C., for example from 30° C. to 50° C., in the extruder feed zone.

According to one or more embodiments, extruding is performed at a temperature of from 160° C. to 220° C. in the extruder solid conveying zone.

According to one or more embodiments, extruding is performed at a temperature of from 180° C. to 240° C. in the extruder solid compression zone.

According to one or more embodiments, extruding is performed at a temperature of from 210° C. to 280° C. in the extruder melting zone.

According to one or more embodiments, extruding is performed at a temperature of from 210° C. to 260° C. in the extruder melt conveying zone.

According to one or more embodiments, extruding is performed at a temperature of from 210° C. to 260° C. in the extruder decompression zone.

According to one or more embodiments, extruding is performed at a temperature of from 180° C. to 260° C. in the extruder melt compression zone.

According to one or more embodiments, extruding is performed at a temperature of from 180° C. to 280° C. in the extruder die zone.

According to one or more embodiments, the temperature profile along the extruder may comprise a combination of one or more of these exemplary ranges of temperatures in the different zones of the extruder.

According to one or more embodiments, the extrusion conditions may comprise, for example, a feed zone temperature of from 30° C. to 200° C., for example from 30° C. to 50° C., a solid conveying zone of from 180° C. to 220° C., a solid compression zone of from 180° C. to 220° C., a melting zone temperature of from 210° C. to 280° C., a melt conveying zone of from 210° C. to 260° C., a decompression zone temperature of from 210° C. to 260° C., a melt compression zone temperature of from 210° to 260° C., and a die zone temperature of from 180° to 280° C.

According to one or more embodiments, the extrusion conditions may vary before and after the introduction of the emulsion in the extruder. For example, the extrusion conditions may comprise a first temperature profile before the introduction of the emulsion into the extruder and a second, different temperature profile after the introduction of the emulsion into the extruder. For example, both profiles may have any of the exemplary values defined above. For example, after the introduction of the emulsion into the extruder, the melt conveying temperature and/or the melt compression zone temperature and/or the temperature of any other extruder zone may be reduced, for example of 10° C.-40° C. For example, after the introduction of the emulsion into the extruder, the die zone temperature may be reduced, for example of 20° C.-60° C., alone or in combination with a reduction of the temperature of any other extruder zone. Independently from or in combination with a possible variation of the temperature along the length of the extruder, also the extrusion pressure may vary along the length of the extruder. For example, the extrusion conditions may comprise a feed zone pressure of from 10 mbar to 50 mbar and a melt compression zone of from 30 bar to 120 bar. The remaining zones may have pressures intermediate to the exemplary pressures of the feed zone and of the melt compression zone.

The extrusion conditions may further comprise an intensive mixing in the extruder. According to one or more embodiments, sufficient mixing may be obtained by setting the screw speed of the extruder within the range of from 190 rpm to 270 rpm.

According to one or more embodiments, the at least one decompression zone may comprise a venting zone, for example including at least one vent port or a plurality of vent ports. The at least one decompression zone may, for example, be arranged about two-thirds down the extruder screw. The decompression zone allows gases, such as moisture and volatiles, to escape from the molten polymer through the venting zone, for example through one or more vent ports provided in the venting zone.

By using a vented extruder comprising at least one vent port, the pressure may be relieved in the at least one decompression zone and any trapped gases may be drawn out by vacuum. With such an extruder, the Applicant has surprisingly found that the method for modifying the rheology of a polymer according to one or more embodiments of the present disclosure provides both rheological modification and additional effects positively influencing the properties of polymers, for example of polyolefins. These effects include the deactivation of active catalyst sites and improved polymer degassing beyond the expectation of the contribution of the water and organic peroxide individually. The deactivation of active catalyst sites and improved polymer degassing in turn result in purer polymers containing less reaction by-products and amount of volatiles, improved organoleptic properties, such as odor and taste, and less color formation. Further, the water of the composition, when removed through the at least one vent port, extracts undesired deactivated species and degradation products from the molten polymer.

According to one or more embodiments, removing is performed by venting the extruder, for example during extruding. Venting may be for example performed through at least one vent or vacuum port, in an extruder venting zone. According to one or more embodiments, a plurality of vent ports may be defined circumferentially around the barrel and/or longitudinally along a portion of the barrel.

The vent port(s) may strip-off the reaction water and undesired deactivation species by means of a predetermined vacuum (i.e., subatmospheric pressure) to assure that no residual water is present in the polymer.

According to one or more embodiments, removing is performed by establishing a predetermined vacuum in the extruder venting zone or in a plurality of venting zones. In case of a plurality of venting zones, each venting zone may be provided in a corresponding decompression zone of the extruder comprising a plurality of decompression zones. However, according to one or more embodiments, a plurality of venting zones may be provided in each decompression zone of the extruder.

According to one or more embodiments, the predetermined vacuum is set to from 0 mbar to 800 mbar, for example from 200 mbar to 800 mbar, for example from 300 mbar to 600 mbar, for example from 350 mbar to 550 mbar. According to one or more embodiments, removing may be performed by setting a predetermined vacuum pressure in the extruder decompression zone comprising a venting zone. For example, the decompression zone vacuum pressure may be of from 0 mbar to 800 mbar, for example from 0 mbar to 600 mbar.

When removing is performed by establishing a predetermined vacuum in an extruder venting zone, the Applicant has found that the VOCs may attain a level which may be reduced by at least 40% when compared to the level of VOCs attainable at atmospheric pressure, at the same extrusion conditions applied to the same polymer in the presence of the same emulsion.

For example, the subatmospheric pressure in the venting zone can be maintained by attaching the at least one vent port to a tube leading to a vacuum pump or other known devices for producing vacuum.

According to one or more embodiments, the polymer may comprise a polyolefin. The polyolefin may be selected, for example, from homopolymers and copolymers of olefins, the olefin monomers having for example from two to eight carbon atoms.

According to one or more embodiments, the polyolefin may be selected from the group comprising polypropylene homopolymers, polyethylene homopolymers, copolymers comprising propylene, copolymers comprising ethylene and combinations thereof. For example, the polyolefin may be selected from the group consisting of polypropylene homopolymers, propylene copolymers, polyethylene homopolymers and ethylene copolymers.

According to one or more embodiments, polyethylene, such as linear low-density polyethylene (LLDPE), low-density polyethylene (LDPE), high density polyethylene (HDPE) as well as ethyl vinyl acetate copolymer (EVA) and polyolefinic elastomer (POE), may be used. According to one or more embodiments, polyethylene homopolymers and copolymers, for example having a density in the range from 0.88 $g/cm^3$ to 0.96 $g/cm^3$, may be used. Polyethylene homopolymers and copolymers may be manufactured by any known process.

According to one or more embodiments, polypropylene may be used, comprising homopolymers, random copolymers, block copolymers and terpolymers of propylene. Copolymers of propylene may comprise copolymers of propylene with other olefins such as ethylene, 1-butene, 2-butene and pentene isomers, and for example copolymers of propylene with ethylene. Terpolymers of propylene may comprise copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. Homopolymers, random copolymers and block copolymers may be manufactured by any known process.

For example, the polymer may be a propylene homopolymer or copolymer. According to one or more embodiments, the propylene homopolymer or copolymer, before the modification of the rheology, may have an initial MFR, measured according to ISO 1133 with a load of 2.16 kg at 230° C., of about 0.2 to about 100 g/10 min, for example from 0.2 to 50 g/10 min, for example from 0.2 to 20 g/10 min.

In the following description and claims, if not otherwise indicated, the MFR is a MFR measured according to ISO 1133 with a load of 2.16 kg at 230° C.

According to one or more embodiments, the propylene homopolymer or copolymer, after the modification of the rheology with one or more embodiments of the emulsion, may have a final MFR, of up to 5000% higher than the initial MFR. According to one or more embodiments, the final MFR may be of from 50 to 2000 g/10 min, for example of from 20 to 100 g/10 min, for example of from 5 to 20 g/10 min.

According to one or more embodiments, the emulsion comprises 20% to 80% by weight of at least one organic peroxide, up to 15% by weight of an emulsifier, and water in quantity enough to complete the 100% of the composition total weight. For example, the emulsifier may be present in an amount up to 15% by weight, for example from 0.1% to 12% by weight, for example from 0.5% to 8% by weight, for example from 1 to 6% by weight, with respect to the total weight of the composition.

According to one or more embodiments, the emulsion may consist of an organic peroxide, water and an emulsifier, for example in the above-mentioned exemplary concentrations.

According to one or more embodiments, the emulsion may comprise from 25% to 75%, for example from 40% to 70%, for example from 55% to 65%, by weight of at least one organic peroxide, up to 15% by weight of an emulsifier, and water in quantity enough to complete the 100% of the composition total weight.

For example, a storage capacity of above 1000 L may be obtained at peroxide dilutions of around 50% by weight.

According to one or more embodiments, the at least one organic peroxide contains less than 10% by weight of active oxygen with respect to the total weight of organic peroxide(s). For example, the at least one organic peroxide may contain less than 7%, for example less than 5%, by weight of active oxygen with respect to the total weight of organic peroxide(s).

According to one or more embodiments, the at least one organic peroxide comprise at least one dialkyl peroxide, such as for example 2,5-dimethyl-2,5-di(t-butylperoxy) hexane, 2,5-dimethyl-2,5-di(tert-butylperoxy)hexane-3, ditert-butyl peroxide, ditert-amyl peroxide; tert-butyl cumyl peroxide, di(tert-butylperoxy-isopropyl)-benzene, dicumyl peroxide, 3,6,9-triethyl-3,6,9-trimethyl-1,4,7-triperoxonane, 3,3,5,7,7-pentamethyl-1,2,4-trioxepane and combinations thereof.

According to one or more embodiments, polymer powder or pellets and the emulsion may be fed into the extruder, which may be for example a single or twin-screw extruder, separately or in combination.

When fed in combination, the polymer powder or pellets and the emulsion may be optionally premixed, for example at a temperature of from 30° C. to 40° C.

The polymer powder or pellets and the emulsion may be fed separately into the extruder at predetermined feed rates. For example, the feed rate of the polymer may be set within the range of 2 to 500 kg/h for lab extruders and within the range of 5 to 100 tons/h for industrial extruders, and the feed rate of the emulsion may be adjusted to obtain a final pellet having a desired MFR.

According to one or more embodiments, the emulsion, when fed separately from the polymer, may be added to the extruder in a continuous manner or in a discontinuous manner, stepwise or gradually. For example, the emulsion may be added to the extruder according to a predetermined frequency.

According to one or more embodiments, the temperatures of the different zones of the extruder, which may have the above-mentioned exemplary ranges of temperatures in a steady state, may be set at lower values, before the emulsion is introduced. For example, the temperatures of the different zones of the extruder may be set within ranges of temperatures which are at least 10° C.-20° C. lower than the corresponding steady-state extrusion temperatures. However, the emulsion may be also introduced after the temperatures of the different zones of the extruder have attained the steady-state ranges of temperatures.

According to one or more embodiments, the emulsion feed rate into the extruder may be gradually increased up to a predetermined value, which may change as a function of the desired final MFR of the pellet. The final MFR may be measured by means of an online rheometer, for example mounted on the die zone of the extruder.

Before increasing the emulsion feed rate into the extruder to a steady-state value, the temperatures of the barrel and die may be either maintained at the same temperatures set before the emulsion is introduced or may be further reduced, for example of further 10° C.-20° C.

According to one or more embodiments, the method may further comprise introducing water in the extruder, separately from the water contained in the emulsion. In this manner, enhanced uniform deactivation may be obtained.

According to a further aspect thereof, the present disclosure relates to a method for modifying the rheology of a polymer, comprising: extruding a molten polymer and a composition comprising at least one organic peroxide and water in emulsion form, and establishing a predetermined vacuum, for example set in any of the exemplary ranges defined above, in at least one extruder venting zone. The emulsion may comprise at least one emulsifier, for example as defined above with reference to the first aspect of the disclosure.

According to a further aspect thereof, the present disclosure relates to a polymeric composition obtained by one or more of the embodiments of the method defined above. The polymeric composition may have less than 4000 odor units/m$^3$, for example less than 3000 odor units/m$^3$, for example less than 2000 odor units/m$^3$.

The polymeric composition may be used to prepare different product applications, such as for example molding, films and fibers applications. Examples of product applications are injection and blow molding products, such as for example injection and blow molding products used for packaging and automotive application. Spunbond nonwoven and melt blown fibers applications, such as for example for hygiene, medical, automotive and geotextile applications, may also be exemplary applications for the polymeric composition.

According to a further aspect thereof, the present disclosure relates to the use of a composition comprising at least one organic peroxide and water in emulsion form for deactivating active catalyst sites in a polymer under extrusion conditions.

According to a further aspect thereof, the present disclosure relates to the use of a composition comprising at least one organic peroxide and water in emulsion form for reducing the content of volatiles organic compounds in a polymer under extrusion conditions.

According to a further aspect thereof, the present disclosure relates to the use of a composition comprising at least one organic peroxide and water in emulsion form for reducing yellowing of a polymer under extrusion conditions.

According to one or more embodiments of each of said uses, the emulsion may comprise at least one emulsifier.

For example, in each of the above-mentioned uses, which may performed also in combination, the emulsion may be used in an extruder under one or more of the extrusion conditions defined above with reference to the method. The emulsion and the polymer may be any of the exemplary emulsions and polymers described above.

DESCRIPTION OF EMBODIMENTS

The following examples of methods for modifying the rheology of a polymer are given for illustrating but not limiting purposes.

The examples show the degassing performance of the methods for modifying the rheology of a polymer according to embodiments of the present disclosure.

The examples also show the improved degassing performance obtained by the methods according to embodiments of the present disclosure compared to conventional methods using mineral oil diluted organic peroxide solutions and to conventional pure organic peroxides. The examples also show lower VOCs, lower Yellow Index and lower odor in polymers treated in accordance with embodiments of the method of the present disclosure.

In the following examples, emulsions will be described for modifying the rheology of a polypropylene and of a propylene random co-polymer under extrusion conditions. However, different polymers may be rheologically modified by the method of the present disclosure. Also, emulsions will be described comprising one organic peroxide. However, a plurality of organic peroxides may be used in accordance with one or more embodiments of the method of the present disclosure. Further, also stabilizers and/or additional additives may be used in accordance with one or more embodiments of the method of the present disclosure.

Each exemplary emulsion at a predetermined concentration was fed with an exemplary polymer powder or pellets through a hopper directly into an extruder comprising a vent port. Together with the emulsion and the polymer powder or pellets, any stabilizers and/or additional additives may be also fed through the hopper into the extruder.

The exemplary polymer and the emulsion were extruded in the extruder at an extrusion temperature ranging from 190° C. to 260° C. The extrusion temperature was varied along the length of the extruder. In the examples, the feed zone was cooled with cooling water at a temperature of 38° C., the solid conveying zone temperature was set at 190° C., the solid compression zone temperature was set at 220° C., the melting zone temperature was set at 240° C., the melt conveying zone temperature was set at 240° C. in Example 1 and at 230° C. in Example 2, the decompression zone temperature was set at 230° C., the melt compression zone temperature was set at 240° C. in Example 1 and at 230° C. in Example 2, and the die zone temperature was set at 240° C. in Example 1 and at 260° C. in Example 2.

Also the extrusion pressure was varied along the length of the extruder. In the example, the vacuum pressure in the decompression zone was set at 400 mbar. The melt pressure in the melt compression zone was found to be of about 100 bar.

The polymer and the emulsion were mixed by the screw of the extruder. During the transportation of the polymer through the extruder, polymer degradation occurred. Water and other volatile compounds were removed during the extrusion by establishing a predetermined vacuum in an extruder venting zone provided in the decompression zone and comprising a vent port. The vent port was maintained at a predetermined vacuum of 400 mbar.

Indeed, when the position of the extruder vent port was reached, the water, which, under extrusion conditions, is water vapor, was separated from the molten polymer and exited the extruder through the vent port due to the vacuum. The vented polymer exited the extruder through a pelletizer in the form of pellets.

The removal of water vapor using the method of the present disclosure was significantly improved.

As shown in the following, this improvement resulted in an improved reduction of VOCs, an enhanced reduction of odors and an improved color of the final polymer pellets.

The following methods were used to determine the properties reported in the examples.

Melt Flow Rate (MFR) is the MFR measured according to ISO 1133 with a load of 2.16 kg at 230° C.

VOCs are analyzed using static headspace-gas chromatography analysis according to the standard described in VDA-277.

Color formation during the rheological modification of the polymer is determined by the Yellowness Index (YI) of the polymer pellets. To determine the Yellowness Index, a color determination according to ASTM D6290 with a Group I Spectrophotometer, the LabScan XE from Hunterlab, with a D65/10° arrangement of Illuminant/Observer is performed. A sample cup is filled to the top with pellets, placed on the sensor port and covered with an opaque and light excluding cover. The measurement delivers the Tristimulus values X, Y and Z. The calculation of the Yellowness Index is done according to ASTM E313 by the following equation: YI=100 (Cx X−Cz Z)/Y, where the coefficients Cx and Cz are selected according to the setting of Illuminant and Observer used for the measurement of the Tristimulus values. For Illuminant D65 and Observer 10°, Cx is 1.3013 and Cz is 1.1498.

The odor is evaluated by an odor test accomplished according to the dynamic olfactometry analysis described in the European Standard EN 13725 using 2 hours conditioning at 40° C. The results of the dynamic olfactometry are given in Odor units/m$^3$. One odor unit corresponds to an odor level which 40 ppb of n-butanol releases in 1 m$^3$ of neutral gas.

Example 1

Example 1 shows the improved degassing performance obtained by performing an embodiment of the method the present disclosure compared to a method using a conventional mineral oil diluted organic peroxide solution.

Sample 1 is a standard mineral oil diluted organic peroxide solution available under the commercial name TRIGONOX® 101-E50 (2,5-Dimethyl-2,5-di(tert-butylperoxy) hexane, 50% solution in mineral oil) from AkzoNobel N.V.

Sample 2 is an emulsion comprising 60% by weight of 2,5-Dimethyl-2,5-di(tert-butylperoxy)hexane, 35% by weight of water, 1% by weight of trimethyl nonyl polyethylene glycol ether, 1% by weight polyoxyethylene (9) nonylphenylether and 3% by weight of the alkylene oxide blockcopolymer Pluronic® P-65 (commercially available from BASF). Sample 2 has a total HLB of 15.

The polymer used for rheological modification is a standard propylene homopolymer powder obtained from a commercial Novolen process. The MFR of the polypropylene powder was of 2 g/10 min.

In two different tests, the polypropylene powder and Samples 1 and 2, respectively, were fed in the hopper of a twin screw extruder from Brabender with an L/D (extruder Length/screw Diameter) of 20 and provided with a vent port in a decompression zone of the extruder. Additionally, in each test, a standard additivation package consisting of tris(2,4-di-tert-butylphenyl)phosphite (Irgafos 168® commercially available from Ciba), calcium stearate (Ligastar CA350® commercially available from Peter Greven) and pentaerythritol tetrakis(3-(3,5-di-tert-butyl-4-hydroxyphenyl)propionate) (Irganox 10100 commercially available from Ciba) was fed to the extruder.

Both tests were performed under the same conditions, as detailed in the following. The feed rate of the polypropylene powder was 3 kg/h and the amounts of the peroxide fed to the extruder with respect to the amount of polypropylene fed to the extruder were adjusted to 400 ppm to obtain a final pellet MFR of 25 g/10 min, which corresponds to a feed rate for the peroxide solution in Sample 1 of 2.4 g/h and a feed rate of 2.0 g/h for the peroxide emulsion in Sample 2. The feed rate of the additives was adjusted to 3 g/h for Irganox 10100 and Irgafos 168® and to 1.5 g/h for Ligastar CA350®. The vacuum applied on the vent port was set to 400 mbar. The starting extrusion temperature setting was of 190° C. in the extruder solid conveying zone and was increased up to 240° C. in the melt compression zone and in the extruder die zone. Before introducing the 400 ppm of peroxide into the extruder, the temperature setting in the solid conveying zone was kept at 190° C. and the temperature setting in the melt compression zone and die zone was reduced from 240° C. to 200° C. and 220° C., respectively.

Table 1 shows detailed data of the evaluation using Sample 1 and Sample 2.

TABLE 1

| | Peroxide content in the peroxidic composition [% by weight] | Polypropylene powder MFR [g/10 min] before rheological modification | Polypropylene pellet MFR [g/10 min] after rheological modification | VOCs [mVs] | Yellow Index [—] |
|---|---|---|---|---|---|
| Sample 1 (comparative) | 50 | 2 | 25 | 820 | 9.2 |
| Sample 2 | 60 | 2 | 25 | 640 | 5.0 |

The results of the peroxidic rheological modification of the polypropylene powder with a MFR of 2 g/10 min to a pellet with a MFR of 25 g/10 min with the different compositions show that, at the same active oxygen concentration in the extruder and thus for the same rheological modification, a significant lower level of VOCs is attained when using Sample 2 compared to Sample 1. The lower value for the Yellow Index of Sample 2 indicates lower color formation and hence improved performance of the method according to the present disclosure.

Example 2

Example 2 shows the improved degassing performance obtained by performing a method according to an embodiment of the present disclosure compared to a method using a conventional pure organic peroxide.

Sample 3 is a pure organic peroxide, namely TRIGONOX® 101 (2,5-Dimethyl-2,5-di(tert-butylperoxy)hexane) available from AkzoNobel N.V.

Sample 4 is an emulsion according to an example of the present disclosure comprising 25% by weight of (2,5-Dimethyl-2,5-di(tert-butylperoxy)hexane), 70% by weight of water, 1% by weight of trimethyl nonyl polyethylene glycol ether, 1% polyoxyethylene (9) nonylphenylether and 3% by weight of the alkylene oxide blockcopolymer Pluronic® P-65 (commercially available from BASF). Sample 4 has a total HLB of 15.

The polymer used for the rheological modification is a propylene random co-polymer in powder form with an MFR of 0.3 g/10 min, available from Petroquimica Cuyo in Mendoza, Argentina.

In two different tests, the polymer pellets and Samples 3 and 4, respectively, were fed into the extruder hopper into the twin screw extruder of Example 1 at a feed rate of 3 kg/h for the polymer and approximately 3 g/h for Sample 3 and 12 g/h for Sample 4 to obtain a final pellet MFR of 20 g/10 min. This corresponds to an amount of peroxide fed to the extruder with respect to the amount of polymer fed to the extruder of 1000 ppm for both Samples 3 and 4. Additionally, in each test, a standard additivation package consisting of tris(2,4-di-tert-butylphenyl)phosphite (Irgafos 168 ® commercially available from Ciba), calcium stearate (Ligastar CA350 ® commercially available from Peter Greven) and pentaerythritol tetrakis(3-(3,5-di-tert-butyl-4-hydroxyphenyl)propionate) (Irganox 10100 commercially available from Ciba) was fed to the extruder.

Both tests were performed under the same conditions, as detailed in the following. The feed rate of the additives was adjusted to 3 g/h for Irganox 10100 and Irgafos 168 and to 1.5 g/h for Ligastar CA350®. The vacuum applied on the vent port was set to 400 mbar. The starting extrusion temperature setting was of 210° C. in the extruder solid conveying zone and was increased up to 230° C. in the melt conveying zone and the melt compression zone and to 260° C. in the extruder die zone. Before introducing the peroxide into the extruder, the temperature setting in the solid conveying zone was kept at 210° C. and the temperature settings in the melt conveying zone and melt compression zone were decreased from 230° C. to 200° C.; the temperature setting in the die zone was reduced from 260° C. to 210° C.

Table 2 shows details of the evaluation including the results of an odor evaluation.

TABLE 2

|  | Peroxide content in the peroxidic composition [% by weight] | Polypropylene copolymer powder MFR [g/10 min] before rheological modification | Polypropylene copolymer pellet MFR [g/10 min] after rheological modification | Odor concentration [OU/m³] |
|---|---|---|---|---|
| Sample 3 (comparative) | 100 | 0.3 | 20 | 5970 |
| Sample 4 | 25 | 0.3 | 20 | 1900 |

The results of the rheological modification using Sample 3 and Sample 4 show that, at the same active oxygen concentration in the extruder thus for the same rheological modification, a significant lower Odor unit per cubic meter (OU/m³) is attained for the emulsion of Sample 4 compared to Sample 3 consisting of a pure peroxide. The lower Odor unit per cubic meter means that Sample 4 releases less odorous compounds and has therefore an improved odor. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:
1. A method for modifying the rheology of a polymer, comprising:
    extruding a molten polymer and an emulsion, the emulsion consisting of at least one organic peroxide, at least one emulsifier with a total Hydrophilic-Lipophilic Balance (HLB) value between 6 and 16, and water
    removing volatile compounds generated during extrusion from the molten polymer under extrusion conditions and under a predetermined vacuum;
    reducing both the content of volatile compounds and yellowing of the molten polymer in the presence of the emulsion,
    wherein the volatile compounds comprise water and volatile organic compounds resulting from the degradation of at least one of the organic peroxide or the polymer, and
    wherein removing volatile compounds is performed by establishing the predetermined vacuum in at least one extruder venting zone.

2. The method of claim 1, wherein the predetermined vacuum is set to from 0 mbar to 800 mbar.

3. The method of claim 1, wherein the at least one extruder venting zone is provided in at least one extruder decompression zone.

4. The method of claim 1, further comprising feeding the polymer and the emulsion so that the amount of the at least one peroxide feed ranges from 100 ppm to 6000 ppm with respect to the amount of the polymer feed.

5. The method of claim 1, wherein the at least one organic peroxide contains less than 10% by weight of active oxygen with respect to the total weight of organic peroxide(s).

6. The method of claim 1, wherein the at least one organic peroxide is selected from the group comprising dialkyl peroxides.

7. The method of claim 1, wherein the at least one organic peroxide is selected from the group comprising 2,5-dimethyl-2,5-di(tert-butylperoxy)hexane-3, ditert-butyl peroxide, ditert-amyl peroxide, tert-butyl cumyl peroxide, di(tert-butylperoxy-isopropyl)-benzene, dicumyl peroxide, 3,6,9-triethyl-3,6,9-trimethyl-1,4,7-triperoxonane, 3,3,5,7,7-pentamethyl-1,2,4-trioxepane and combinations thereof.

8. The method of claim 1, further comprising providing the emulsion from a storage having a capacity of greater than 1000 L for the extruding step.

9. The method of claim 1, further comprising adding water to the molten polymer and emulsion mixture in the extruder, beyond the water contained in the emulsion, to further deactivate catalyst sites.

10. The method of claim 1, wherein the emulsion consists of 20% to 80% by weight of the at least one organic peroxide, 0.1% to 15% by weight of the at least one emulsifier, and water in quantity enough to complete the 100% of the emulsion total weight.

11. The method of claim 1, wherein the at least one emulsifier is selected from the group comprising polyethoxy phenols, alkylene oxide block copolymers, ethoxylated fatty alcohols, ethoxylated fatty acids, sorbitan fatty acid esters, sorbitol esters and combinations thereof.

\* \* \* \* \*